Oct. 11, 1932.   J. W. LONG ET AL   1,881,757
TELEGRAPH TRANSMITTING APPARATUS
Filed Oct. 23, 1931   3 Sheets-Sheet 1

INVENTOR-
J. W. LONG
R. STEENECK
BY Eugene C. Brown
ATTORNEY

Oct. 11, 1932. J. W. LONG ET AL 1,881,757
TELEGRAPH TRANSMITTING APPARATUS
Filed Oct. 23, 1931  3 Sheets-Sheet 2

FIG. 1-A

INVENTOR-
J. W. LONG
R. STEENECK

Eugene E. Brown
ATTORNEY-

Oct. 11, 1932.  J. W. LONG ET AL  1,881,757
TELEGRAPH TRANSMITTING APPARATUS
Filed Oct. 23, 1931  3 Sheets-Sheet 3
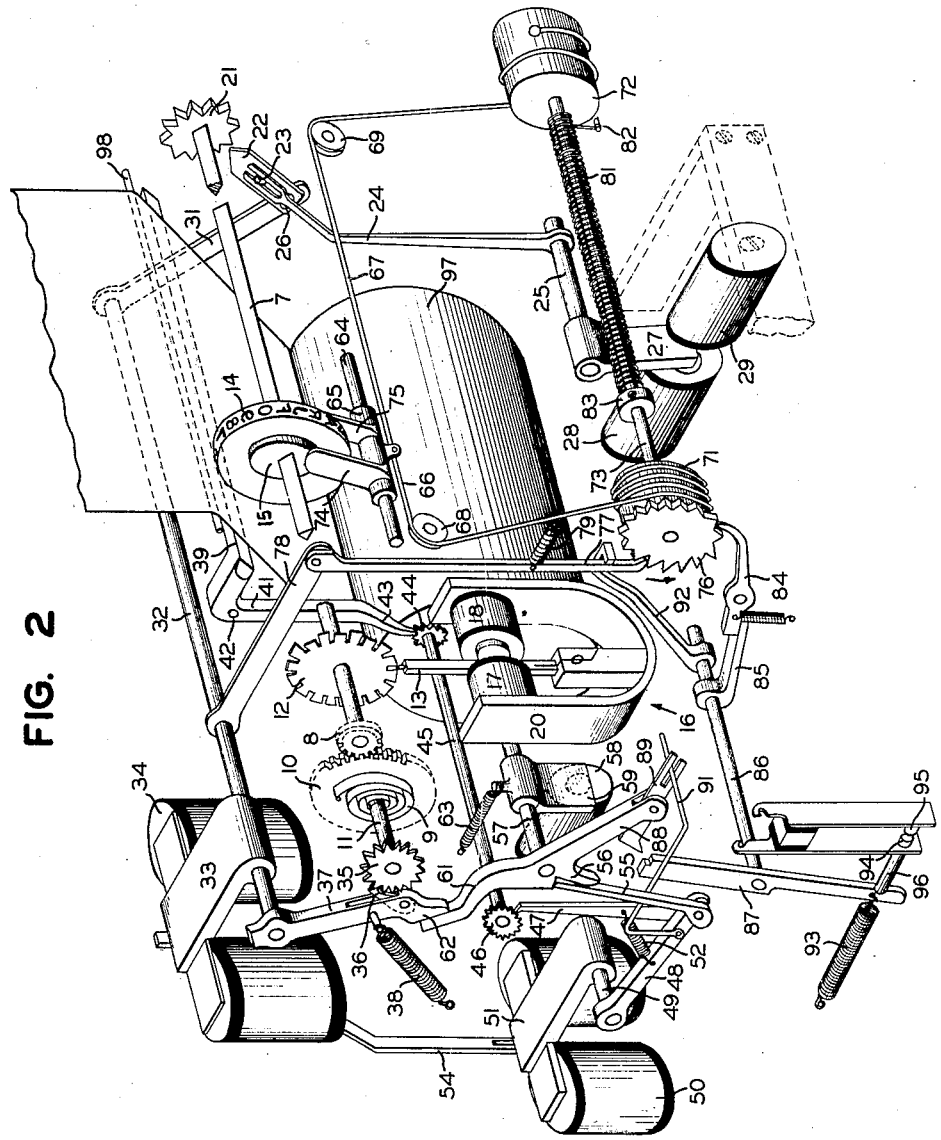
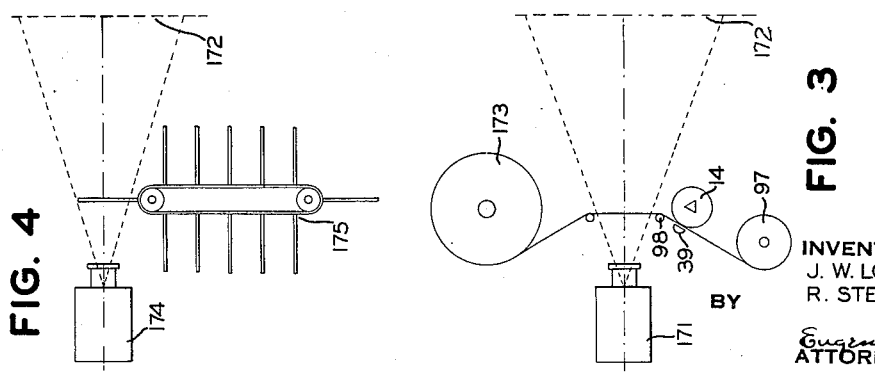
INVENTOR-
J. W. LONG
R. STEENECK
BY
Eugene L. Brown
ATTORNEY- Patented Oct. 11, 1932

1,881,757

UNITED STATES PATENT OFFICE

JAMES W. LONG, OF PLAINFIELD, NEW JERSEY, AND ROBERT STEENECK, OF NEW YORK, N. Y., ASSIGNORS TO THE WESTERN UNION TELEGRAPH COMPANY, OF NEW YORK, N. Y., A CORPORATION OF NEW YORK

TELEGRAPH TRANSMITTING APPARATUS

Application filed October 23, 1931. Serial No. 570,728.

This invention relates to telegraph transmitting apparatus and more particularly to a mechanism for transmitting signals of the step-by-step type, consisting of current alternations, prolonged steady current and zero current. The transmitting apparatus is concerned especially with the transmission of signals for a telegraph printer of the Burry page type, as shown in United States Patent No. 962,694, granted June 28, 1910, but, of course, is not limited thereto.

It is shown applied to the joint control of a printer of this nature for use in a page projecting mechanism, such as shown and described in a copending application of Long and Wheeler, Serial No. 517,353, filed February 20, 1931, and entitled Page projector for recorders, for projecting news items upon a suitable screen, and a second projector alternating therewith for displaying previously prepared material, such as advertisements, news pictures, and the like.

One of the objects of the invention is to provide a telegraph transmitting mechanism controlled from either a keyboard or automatic transmitter operating on the Baudot code, to send out step-by-step signals and special functioning signals, such as case shift, press, unison and carriage return.

Another object is to provide a telegraph transmitter of the above nature, which in addition, will transmit signals of a nature capable of shifting the projections from one of the above named projectors to the other.

Numerous other objects and advantages of the invention will appear from the following description.

The several features of the invention can best be explained by reference to the accompanying drawings in which:

Figures 1 and 1a are continuation views showing diagrammatically a transmitting and receiving apparatus and circuit connections embodying our invention.

Figure 2 shows in perspective the essential mechanism of the Burry printer controlled by the transmitting apparatus;

Figure 3 is a diagrammatic showing of a projection system for telegraph printer; and Figure 4 is a similar view of a projector for previously prepared lantern slides.

Figure 1:
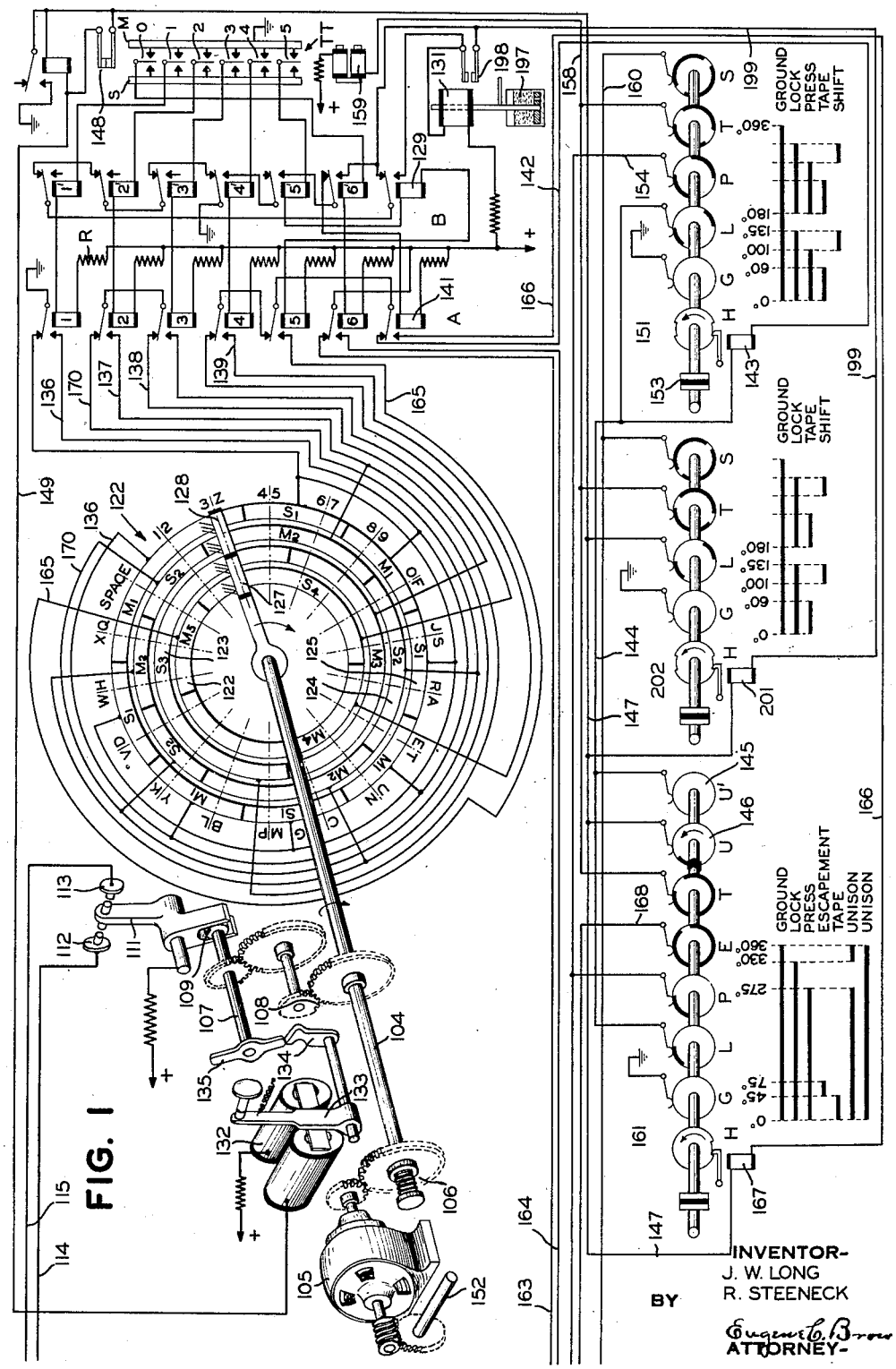

The invention is concerned with the operation of news projectors for use in public places, such as hotels, restaurants, show windows, etc., for displaying in enlarged characters, on a suitable screen, current news items transmitted telegraphically to the projecting apparatus. In accordance with the present embodiment of the invention, the telegraph signals are transcribed by a telegraph page printer from which each line, as it is printed, is advanced into the field of the projector. Preferably after completion of each news item, the news projector is shut-off and a second projector switched-on for showing locally prepared material on the screen during the course of printing of a predetermined number of lines of the succeeding news item. The locally prepared material may consist of lantern slides arranged in a suitable magazine and automatically fed into projecting position or it may consist of a locally operated transmitter on which local items of information may be printed.

The signal transmitting apparatus for controlling the telegraph printer and the projecting apparatus will be better understood if preceded by a description of the essential mechanism of the receiving printer. Accordingly, the printer mechanism shown in Figure 2 will first be described.

In this figure the supporting members for the various parts have been omitted for convenience of illustration and are fully shown in the aforesaid Burry patent.

The type which produces the impression are arranged on a type wheel 14, having a hub 15 mounted to slide freely on a triangular shaft 7 but adapted to rotate with the shaft whereby the type wheel can be revolved, by rotating the shaft, to bring any character to position and may be shifted laterally to effect the letter spacing.

The shaft 7 has a pinion 8 mounted thereon and adapted to be rotated by a gear 10 loosely mounted upon a shaft 11 and actuated by a spring 9 so as to exert a constant force upon the type wheel shaft. The type wheel shaft carries an escapement wheel 12, having staggered teeth on its opposite sides and adapted to be controlled by a vertical armature 13, vibrated by a polarized magnet 16, having coils 17 and 18, carried by a U-shaped magnet 20. As the armature tongue 13 vibrates, the escape wheel is released permitting the type wheel to be stepped around into printing position. The teeth on the escape wheel are so arranged that for each impulse received the type wheel moves through a space of two characters. The type wheel may then be given a slight rotary movement backward, if desired, to bring the other character of a pair into position for printing. For this purpose, the type wheel shaft is provided with a star wheel 21, adapted to be engaged by a pointed finger 22. If the finger 22 be raised and shifted towards the star wheel, the apex thereof will enter a notch on the wheel and cause the wheel to turn backward slightly, so as to bring the opposite character of the pair into proper printing position.

In order to shift the finger 22, it is provided with a pin 23 engaged by the forked end of an arm 24 rigid with a shaft 25. By rocking the shaft 25, the pointed end of the shifting member 22 will swing on its pivot 26 and so engage the rear wall of the notch in the star wheel. The shaft 25 is rocked by an armature 27 lying between polarized magnets 28 and 29. The shifting finger 22 is pivoted on the lower end of an arm 31, the other end of which is rigidly mounted on a shaft 32 adapted to be rocked through the armature 33, by a magnet 34. The magnet 34 also furnishes the power for effecting letter spacing as will hereinafter appear. The energization of this magnet advances the shifting finger so as to throw the type wheel backward.

The mechanism for winding the spring 9 comprises a ratchet wheel 35 on the shaft 11 engaged by a pawl 36, pivoted on the lower end of an arm 37, carried by the shaft 32. The arm 37 is depressed by a coiled spring 38 and upon each downward movement thereof rotates the shaft 11 to wind the spring 9.

The printing is effected by a platen 39 mounted on angular supports, one of which is shown at 41, pivoted at 42 to a frame member not shown. The support 41 has a downwardly extending arm 43 engaging with a ratchet wheel 44, fastened to a shaft 45, whereby quick rotation of the ratchet wheel will rock the support 41 and throw the platen forward against the type wheel. The shaft 45 at its opposite end carries a ratchet wheel 46 engaged by a vertical pawl 47, pivoted to a lever 48, carried by a shaft 49, rocked by a magnet 50 through an armature 51. The pawl 47 is held in contact with the ratchet wheel 46 by a spring 52. Actuation of the magnet 50 will raise the pawl so as to rotate the ratchet wheel 46 and thereby operate the platen. For the purpose of raising the armature 51 to its initial position upon deenergization of the printing magnet 50, it is connected to the armature 33 by a rod 54 slotted at its lower end to permit independent operation of the two armatures.

In order to make the machine rapid in operation, the magnets 28, 29, 34 and 50 are intended to be energized simultaneously but their armatures should not be actuated at the same instant. That is, armature 27, which sets the shifting member 22, should precede armature 33, which actuates the shifting finger, while the last mentioned armature should precede the armature 51 which effects the printing. The precedence of magnets 28 and 29 is secured by making them quicker in action and the proper order is given to the others by the following means.

Pivoted on the arm 48 is an up-standing finger 55, normally engaging a rearward shoulder on a downwardly extending stop 56 rigidly mounted on a shaft 57, rocked by a magnet 58, through an armature 59. So long as the finger 55 is in engagement with the stop, the arm 48 and pawl 47 cannot be raised. If the magnet 58 is energized, however, to rock the stop 56, so as to throw the finger 55 off of the shoulder, the pawl 47 may be raised to effect the printing. The magnet 58 may be energized simultaneously with magnets 34 and 50 but evidently the first named should not actuate its armature until the magnet 34 is actuated as otherwise the printing might be effected before the type wheel was set. Therefore, in order to insure the operation of magnet 58 after magnet 34, an arm 61, integral with the stop 56, is provided having engagement below an extension 62 of the arm 37, actuated by the magnet 34. In order for the magnet 58 to act before magnet 34, it is necessary to raise the arm 37, but the spring 38 added to the tension of the spring 63 puts too great a load on the arm 61 for the magnet 58 to move unaided and the result is that although current is flowing through both magnets simultaneously, magnet 58 cannot act to release the printing mechanism until 34 is actuated and causes the type wheel to be set.

For shifting the type wheel along the shaft 7 to effect the letter spacing, a rail 64 is provided upon which a hub 65 is adapted to slide. Extending in opposite directions from the hub are two flexible cords 66 and 67, passing over pulleys 68 and 69 and winding in opposite directions on drums 71 and 72 respectively, fixed on a shaft 73. As the shaft is rotated to wind the cord 67 on its drum, the hub is drawn to the right while rotation of the shaft in the opposite direction winds up the cord 66 and returns the hub to the left. Two arms 74 and 75 extend upwardly from the hub and embrace the type wheel hub 15 so as to permit rotation of the latter, but cause same to move along the shaft 7 in combination with the hub 65. The letter spacing is produced by a ratchet wheel 76 on the shaft 73 and a pawl 77 extending upwardly and pivotally connected to an arm 78 fixed to the shaft 32. Hence each actuation of the magnet 34 raises the pawl, causing it to ride over a tooth of the ratchet wheel and upon de-energization of the magnet the pawl is depressed, rotating the shaft 73 to move the type wheel one letter space. The pawl 77 is held in yielding engagement with the ratchet by a spring 79.

The return of the type wheel to its initial position is effected by a spring 81, coiled around the shaft 73 and having one end anchored to a fixed pin 82 and the opposite end secured to a collar 83, fixed on tht shaft 73. The spring 81 is arranged to be wound up by the rotation of the ratchet wheel 76 as the type wheel moves to the right. The ratchet wheel 76 is provided with a holding pawl 84 which serves to prevent unwinding of the spring during the retraction of the operating pawl 77. In order to return the type wheel to the left it is necessary to withdraw both the operating pawl 77 and the holding pawl 84. This release of the ratchet wheel 76 is effected as follows.

Below the rear end of the pawl 84 is a finger 85 fast to a shaft 86 having on its left end an upwardly extending arm 87 provided with a shoulder on its upper end, as shown. The shaft 86 is rocked by the arm 61 (which it will be remembered is oscillated by the magnet 58). For this purpose the arm 61 has an extension 88 provided with a small lever 89 arranged to engage the shoulder on the arm 87. Normally the lever is held out of engagement with said arm by a light spring rod 91 mounted upon the arm 48 and having its forward end turned laterally to engage the bifurcated forward end of said lever. When, however, the arm 48 is raised by the magnet 50, the rear end of the lever 89 is depressed against the top of the arm 87. If now the magnet 58 be de-energized momentarily it will permit the spring 63 to throw the arm 88 forward and with it the lever 89, thus permitting the rear end of the latter to be depressed by the spring rod 91 into engagement with the shoulder on the arm 87. On again energizing magnet 58, the arm 88 moves the lever 89 rearwardly, rocking the arm 87 and disengaging the pawl 84 from the ratchet 76 as previously described. On one end of the shaft 86 is an upwardly extending arm 92, the upper end of which lies in front of the pawl 77 and serves to withdraw the same from the ratchet wheel simultaneously with the withdrawal of the holding pawl 84. With both pawls disengaged the spring 81 is free to return the type wheel to its initial or left-hand position.

Each movement of the lever 87, to effect the type wheel or carriage return, closes a pair of contacts 94 and 95 by means of a pin 96, for a purpose to be subsequently referred to.

The paper on which the impressions are made is drawn from a roll 97 suitably mounted at the back of the machine and passes between the platen and the type wheel. From the platen the paper passes over a small roller 98 and upward into the field of a projector, as shown diagrammatically in Figure 3. Upon each type wheel return the paper is fed upwardly one line space by mechanism not shown.

The wiring of the machine is illustrated at the left side of Figure 1A, from which it will be seen that two circuits are employed, designated as line L1 and line L2. In circuit with the line L1 is the escapement magnet 16 and in circuit with line L2 are the shift magnets 28 and 29. The magnet 58 is controlled by a relay 99 in line L1 and the magnets 34 and 50 are controlled by a relay 101 in line L2.

The operation of the machine will now be readily understood. The first function to be performed is the rotating of the type wheel to bring the printing point adjacent a pair of characters, one of which it is desired to print. For this purpose alternate positive and negative impulses are sent over the line L1 to actuate the escapement magnet 16 until the selected pair of characters are adjacent to printing position. Steady current is then applied to the line L1 to energize the magnet 58 but its armature is not actuated since, as explained, the magnet cannot operate until its armature load is partially relieved by the action of the magnet 34. An impulse of either positive or negative polarity is sent over line L2 simultaneously with the application of steady current to line L1, the polarity of this last impulse determining which character of the pair is to be printed. If a positive impulse is received the magnet 28 will be energized to shift the member 22 in one direction and if a negative impulse is received the magnet 29 serves to shift the member 22 in the opposite direction. These magnets being quick acting, the shift member is set before the magnets 34 and 50 are fully energized. With current now flowing in both lines the magnet 34, instantly after the setting of the shifting member 22, draws down its armature, thereby throwing the shifting member into engagement with the star wheel 21 and at the same time raising the arm 37 off of the arm 61 and relieving the magnet 58 of part of its load. This magnet also being energized at the same time thereupon draws down its armature, thereby releasing the printing mechanism by disengagement of the stop arm 55 and permitting the magnet 50 to actuate the platen. On de-energization of the magnet the parts are returned to normal position.

The printing wheel may be returned to its initial position from any point in its line of travel after the printing operation by interrupting the circuit to the magnet 58 and making it again, while maintaining the circuit to the magnets 34 and 50. The interruption of the circuit of magnet 58 lowers the lever 89 into contact with the arm 87 and as the circuit is again closed to the magnet 58, the arm 87 is thrown rearwardly, thus disengaging the pawls 77 and 84. The type wheel is thus returned to its leftward position.

It will be noted therefore that the signals required to operate the printer consist of current alternations followed by a steady impulse over one line and simultaneously with said steady impulse, an impulse of predetermined polarity over the other line. In order to effect the carriage return the long impulse over line L1 is momentarily interrupted and remade while the circuit is maintained over line L2.

Referring now to Figures 1 and 1A the transmitting mechanism for producing such printer operating signals will be described. The shaft 104, driven by a uniform speed motor 105 through a slip clutch 106, drives a shaft 107 at a speed nine times greater than shaft 104, through suitable gearing 108. An eccentric 109 on the shaft 107 operates a pole changing switch 111, connected to positive battery and arranged to alternately engage contacts 112 and 113. These latter contacts are connected by wires 114 and 115, respectively, to the left and right hand coils of a master pole changer 116, whereby the tongue 117 of the master pole changer follows the movement of the tongue 111. The tongue of relay 116 is also connected to positive battery and serves to actuate the transmitting pole changer or impulse generator 118. The contacts of impulse generator 118 are connected to positive and negative battery respectively, and the tongue 119 thereof is connected to the line L1, through the back contact of a neutral relay 121. Consequently as the shaft 104 rotates, current alternations are transmitted over the line L1 to the distant printer and when the rotation of the shaft is stopped, steady current is transmitted over the line L1, the polarity of which depends upon the particular position of the pole changer tongue 119. The current alternations, while operating the escapement magnet 16 of the printer, do not operate the relay 99 and consequently the magnet 58 is not energized thereby. After the type wheel has been rotated to position corresponding to a pair of characters, one of which is to be printed, the last impulse must be prolonged to actuate the relay 99 and through its front contact to energize the magnet 58, so as to release the press magnet 50 as previously explained. This is accomplished by stopping the shaft 104 for a sufficient time to complete the printing function.

The stopping of the shaft 104 at the proper point is controlled by a selector head 122, concentric with the shaft 104 and having a plurality of positions indicated by dot and dash lines, corresponding to each pair of characters on the type wheel. The head is provided with four rings, 123, 124, 125 and 126, segmented with marking and spacing segments, as indicated at S1 to S4 and M1 to M4. The rings 123 and 124 are bridged by a brush 127, and rings 125 and 126 are bridged by a brush 128. The brushes 127 and 128 are rotated across the rings by the shaft 104. The selections are set up on a group of six selecting contacts numbered 0, 1, 2, 3, 4, 5 of a transmitter TT which may be tape controlled or manually operated. The transmitter TT has a marking bus bar M and a spacing bus bar S, the former being grounded and the latter insulated. The contacts of the transmitter are adapted to be positioned in accordance with a six unit code of the Baudot type. In this code the five contacts 1 to 5 determine the positioning of a pair of characters on the type wheel and the 0 or shift contact determines which character of the pair is to be printed.

The contacts 1 to 5 are connected individually to the windings in series of the correspondingly numbered relays of groups A and B, and thence through individual resistances R to a source of potential. The first or 0 contact is similarly connected to the relay 6 and 6' of each group in series and thence to battery. The contact 5 also includes in its circuit the winding of a release relay 129.

The back or spacing contact of relay 1, is connected to each of the segments S1 of the selector head, and the front contact is connected to segments M1. Similarly the back and front contacts of relay 2 are connected to segments S2 and M2; the contacts of relay 3 are connected to segments S3 and M3, and contacts of relay 4 are connected to segments S4 and M4. The front or marking contact of relay 5 is connected to segment M5. The remaining contacts and the tongues of the relays of groups A and B are connected as shown in such manner that a baffle circuit for a stop magnet 132 will be completed in any one of the eighteen positions of the brushes 127 and 128 when the tongues of the transmitter TT are positioned to correspond to the segments on which the brushes ride. The stop magnet when energized engages its armature 133 to thereby position a stop member 134 in the path of a stop clip 135, carried by the shaft 107.

An illustration will suffice to explain the baffle circuits. Assume the character L is to be selected. This is represented in the Baudot or permutation code by contacts 1, 2 and 4 of the transmitter TT in marking position and contacts 3 and 5 in spacing position. Accordingly the relays 1, 2 and 4 of group A are shifted to their lower or marking contacts and the relays 3 and 5 are placed on their upper or spacing contacts. A circuit may then be traced for ground at the tongue of relay 1, lower contact of this relay, conductor 136 to segment M1 of the selector head and with the brushes in position BL, through brush 129 to segment M2, conductor 137 to the lower contact of relay 2, tongue of this relay to the tongue and upper contact of relay 3, thence by conductor 138 to segment S3, brush 127, segment M4 and by conductor 139 to the lower or marking contact of relay 4. The circuit then proceeds from a tongue of this relay to the upper contact of relay 5, its tongue and the tongue and upper contact of carriage return relay 141, thence by conductor 142 to the release magnet 143, conductor 144 and unison rings U' and U and their brushes to the conductor 147 and thence to the right through the auto-control contacts 148 and conductor 149 to the stop magnet 132 and positive battery.

The shaft 104 is thus brought to rest with the brushes opposite the BL position. The corresponding letters are thus brought adjacent the printing position of the printer and either letter may be printed by transmitting an impulse of the proper polarity over the line L2. The control of this impulse is effected through a rotary contact group 151, which may be driven from the motor 105 through the shaft 152 and a slip clutch 153.

The contact group comprises a holding disk H, ground ring G, locking ring L, press ring P, tape ring T and shift ring S. When magnet 143 disengages the holding pawl from the disk H, the rings are allowed to rotate through an angle of 180 degrees. A timing diagram is shown beneath the group illustrating the timing of the circuits completed through each ring.

As the rotary contact group starts to rotate a locking ground is applied through the rings G and L to the conductor 144, to hold the stop magnet 132 energized independently of the baffle circuit completed through the relay group A and the selector head. At the same time a circuit is completed from ground at the ring G, through the press ring P and conductor 154 to the master press relay 155 (see Figure 1a). Upon actuation of this relay the transmitting press relay 156 operates, through an obvious circuit, applying either positive or negative battery to the line L2, depending upon the previously set position of the shift transmitting relay 157. The press and shift impulse is thus transmitted over the line L2 simultaneously with the prolonged impulse over line L1. These two impulses effect the printing of the character as previously explained. The press impulse is maintained during the rotation of the contact group 151 through an angle of 100 degrees.

Simultaneously with the starting of the rotary contact group, a circuit is also completed from the ground ring G through the tape ring T and conductor 158 to the tape stepping magnet 159 of the tape transmitter, thereby setting up a new combination on the transmitter contacts. This function is completed in the first 60° of travel of the contact group. Consequently, upon completion of the press impulse at the 100° point the shift magnet 157 may be set in readiness to transmit the proper polarity of current during the press impulse accompanying the succeeding character. This is accomplished through the shift ring S, ground being applied therethrough; at the end of the press impulse over conductor 160 to the left and right windings in parallel of the master shift relay 162 and conductors 163 and 164; respectively, to the upper and lower contacts of shift relay 6 of group A. This circuit is completed to battery through either the right or left windings of the master shift relay 162 depending upon the position of the tongue of the relay 6. The position of relay 6 is determined by the position of the zero contact of the tape transmitter TT.

At the end of the shift function, that is, as the rotary contact group 151 completes 135° of its travel, the locking ground is removed from the stop magnet 132 at ring L, releasing the stop clip 135 and permitting the shaft 104 to again rotate to transmit the succeeding escapement signals for positioning the type wheel in accordance with the new combination set up in the tape transmitter. The cycle just described is then repeated for the next character and so on until the end of the printed line is reached or until it is desired to start a new line at which time a carriage return signal is set up in the tape transmitter.

It will be noted that the rotary contact group 151 automatically times and controls the auxiliary operations accurately and with a minimum of delay between succeeding operations.

The signals incident to the carriage or type wheel return are controlled by a second rotary contact group 161. The carriage return signal is represented in the Baudot code by contacts 1, 4 and 5 of the transmitter in marking position and contacts 2 and 3 in spacing position. With this combination set up in the tape transmitter two baffle circuits may be traced, one through the relays of group B for actuating the carriage return relay 141 to its front contact for selecting rotary contact group 161 and the other through the relay group A and selecting head 122, for transmitting escapement signals to step the type wheel into a blank or "space" position. With the relays 1, 4 and 5 of group A and 1', 4' and 5' of group B energized, the first circuit may be traced from ground at the tongue of relay 4', front contact of this relay to the tongue and front contact of relay 5' and thence from the tongue and back contact of relay 6' to the relay 141 and positive battery, thereby positioning the tongue of the relay 141 on its lower or front contact. The second baffle circuit may then be traced from ground at the tongue of relay 1, the front contact of this relay, conductor 136 to segment $M_1$ and to the brushes 127 and 128 in the position marked "space", through brush 128 to segment $S_2$ and by conductor 170 to the upper or spacing contact of relay 2, thence by the tongue and upper contact of relay 3, conductor 138, segment $S_3$, brush 127, segment $M_5$, conductor 165, lower contact and tongue of relay 5, tongue and lower contact of relay 141 and conductor 166, to the starting magnet 167 of rotary contact group 161. The circuit is then continued through conductor 147 and auto-stop contacts 148, to stop magnet 142 and to positive battery. The transmitting apparatus is brought to rest with the brushes in the "space" position and the rotary contact switches 131 are released for one revolution. This group is provided, in addition to the holding disc H, ground ring G, lock ring L, press ring P and tape ring T, with an escapement ring E and two unison rings U and U'. The unison rings are insulated from the remaining rings as shown. On starting of the contact group the locking ring L moves into position to apply holding ground, through the unison rings U and U', to the stop magnet 132 in the same manner as with the control group 151, thus permitting the next selection to be set up in the tape transmitter TT through the tape ring T.

In order to effect a carriage return it will be remembered that it is necessary to maintain the press magnets of the printer 34 and 50 energized while momentarily releasing a magnet 58 and re-energizing the same. Consequently, the press circuit over line $L_2$ is held continuously closed under the control of the press ring P for 330° of revolution of the contact group and the escapement circuit, which is normally closed when shaft 104 is at rest, is momentarily opened at the relay 121 under the control of the escapement ring E. This ring has a short metallic section engaged by its brush between 45° and 75° of its rotation thereby completing a circuit from ground at the ring G through the ring E and conductor 168 to the master carriage return relay 169 and thence to positive battery. This relay upon operating completes an obvious circuit to the break relay 121 thus opening the escapement circuit and momentarily interrupting the flow of current over the line $L_1$. This momentary interruption permits the levers 89 and 87 of the printer to engage so that upon reenergization of the magnet 58 upon closing of line $L_1$ the lever 87 will be rocked so as to operate the carriage return mechanism and at the same time to close the contacts 94, 95.

At the conclusion of the carriage return operation it is desirable to transmit a unison signal to restore the type wheel and selector head brushes into corresponding positions. This is effected by releasing the brushes 127 and 128 to make at least one complete revolution to step the type wheel into unison position. For this purpose the unison ring U is provided with an insulating section adapted to interrupt the locking circuit of the stop magnet 132 at the end of the press impulse, that is at the 275° point. The shaft 104 is thus released to transmit escapement impulses over the line $L_1$. At the end of 330° of revolution of the contact group the locking circuit of the stop magnet is released at the ring L, thus freeing the transmitting shaft 104 to transmit the character last set up in the tape transmitter. The carriage return mechanism also actuates the line feed mechanism of the printer so that the printing may now proceed along a new line.

The sheet upon which printing is effected is fed upwardly into the field of a projector. This is illustrated diagrammatically in Figure 3 in which the paper is shown being fed from a reel 97 between the type wheel 14 and platen 39 and thence over the roller 98 and up into the field of the projector 171 by which the image of the printed sheet is thrown upon the rear of a screen 172. The paper is taken up on an upper reel 173. As clearly disclosed in the aforementioned application of Long and Wheeler, the arrangement of the platen relative to the printer is such that each line as it is completed, is advanced directly into the field of the projector.

In Figure 1A we have shown a second projector 174 associated with the news projector 171, both projectors being disposed with the center line of projection slightly off normal to the screen 172 whereby either projector may be employed to illuminate the same area of the screen. The projector 174 may be a locally controlled printer projector, a moving picture projector, or an automatic lantern slide projector. The latter form has been diagrammatically illustrated in Figure 4 as provided with an endless slide carrier 175 arranged to feed the slides one at a time into the field of the projector. A projector of this type is shown in patent to Patterson, No. 1,352,471, granted September 14, 1920. The slides may embody advertising matter, news pictures, written or printed notices, or any other desired material.

Line signals transmitted to the printer serve to control the alternate operation of the projectors 171 and 174. The Burry printer operates at a speed somewhat slower than that at which the items may be readily read. It is desirable, therefore, during the printing of the first part of the item, for instance the first four lines, to switch the projection to the advertising projector 174 and after completion of the printing of these lines to return the control to the news projector 171. The news projector is then maintained in operation until the printing of the item has been completed. After the last line of the news item appears on the screen sufficient time is given to enable the reading of the message to be completed after which the news projector is again switched off and the advertising projector switched on and maintained in operation until the first part of the succeeding message has been printed.

The mechanism for effecting the alternate operation of the projectors comprises a stepping relay 176 and a time switch mechanism 177. In the position shown in Figure 1A, the light controlling relay 178 is de-energized, interrupting the circuit to the lamp 179 of the projector 171 and completing the circuit for the lamp 181 of the projector 174, so as to project the advertising matter onto the screen 172. If a news item is now printed, the news projector 171 will remain off until the first four lines of the item have been completed. It will be recalled that upon each carriage return, the switch contacts 94, 95 of the printer were closed. These contacts are included in a circuit with the stepping magnet 182 of the switch 176, so that upon the completion of each line, the magnet 182 is energized to attract its pawl 183 so as to step the ratchet wheel 184 one tooth. The ratchet wheel is held during retraction of the pawl 183 by a holding pawl 187. As the fourth line of printing moves upward into the field of the projector, the arm 185 will be moved onto the last contact 186 against the stop member 188. A circuit will be completed at this time from ground at the arm 185 to the magnet 178, causing it to attract its armature and switching the light circuit from the lamp 181 to the lamp 179. The four lines of printed matter are then thrown onto the screen and as each succeeding line is completed, it is advanced into the field of the projector. The projector remains in operation until a special signal is received over the line. In the present embodiment this signal for switching from the news projector to the advertising projector at the end of a news item, consists of a prolonged series of current alternations transmitted over the line $L_1$. This series of current alternations continues over an interval of several seconds, preferably about fifteen. The purpose of prolonging the switch impulses is to maintain the last printed line on the screen sufficiently long to enable complete reading thereof before the switch-over occurs.

The line relay 99, as stated, is of a sluggish nature so as not to respond to current alternations of the frequency transmitted, and consequently, it rests upon its back contact applying ground to the winding 189 of the time switch 177. This switch is adjusted, by means of a dash-pot 191, so that it does not act within the time consumed in the transmission of current alternations during normal signal transmission periods, which require only a frequency of a second, but upon continued application of current alternations to the line for a prolonged period, it acts to close the contact 192, completing a circuit to the release magnet 193, thereby withdrawing the holding pawl 187 and permitting the ratchet wheel 184 and arm 185 to be returned to its initial position against the stop 195, by the spring 196. The circuit to the magnet 178 is thus interrupted, switching the lighting circuit to the advertising projector 174.

The transmission of this prolonged series of current alternations for switching from the news projector to the advertising projector, is controlled from the tape transmitter TT by setting up a release combination on the transmitter contacts. This combination is of such nature that it does not enable any baffle circuits to be completed through the selector head 122, and in the present embodiment may consist of the transmitter contacts 0, 1, 2, 3 and 4 in spacing position, and contact 5 in marking position. When such a combination is set up, the brushes 127 and 128 rotate continuously until stopped by some means independent of the control of the selector head. We employ the timing switch 131 for this purpose. With the number five contact in marking position, a circuit will be completed from ground at the tongue of relay 4', through its back contact to the back contact and tongue of relay 3', through the tongue and back contact of relay 2', through the back contact and tongue of relay 1', through the tongue and front contact of relay 129, thence through the windings of the slow relay 131 to positive battery. The slow relay 131 does not operate immediately, however, due to the dash-pot 197, but delays its operation for a period which, as stated, may be about fifteen seconds, so as to enable the transmission of a prolonged series of current alternations to the line, sufficient to insure the operation of the slow relay 177 at the receiving station. When the normally open contacts 198 of relay 131 close, a ground is applied through conductor 199, starting magnet 201 of the rotary contact group 202, and by conductor 147 to the stop magnet 132 and positive battery. The stop magnet 132 and start magnet 201 arrest the transmission and start the rotary contact group 202 into operation. This latter group serves to lock up the stop magnet 132 through the locking ring L and the unison rings U and U' of group 161. It also serves to step a new combination into the tape transmitter through the ring T, and through ring S to operate the shift magnet 157 in accordance with the requirements of the new combination. After the shift has been completed, the locking circuit is released to permit the transmission of the next character to be started.

The rotary group 202 also serves to lock up the transmitting shaft and step the tape ahead whenever a rub-out signal appears in the tape. The rub-out signal consists of all of the transmitting contacts in marking position and is employed whenever an error has been made in the perforation of the tape, the tape being backed up in the perforator and reperforated with a complete row of holes, to blank out the error. The rub-out combination actuates all of the relays 1' to 6', completing a circuit from ground at the tongue of relay 4' through a circuit including front contact of the relay 4', tongue and front contacts of relays 5' and 6' in series, and conductor 199, to the release magnet 201, and thence by a conductor 147 to the transmitter stop magnet 132. The transmitter brushes are thus held at rest so that no signal is transmitted over the line corresponding to the rub-out signal in the tape, and the succeeding combination is stepped into the tape transmitter by the operation of the contact group 202.

The rotary contact group 202 and relay group B also serve to step blank tape through the transmitter without causing the operation of the transmitter brushes 127 and 128. Blank tape consists of unperforated tape which causes all of the transmitter contacts to rest on their spacing side. When blank tape advances into the perforator, all of the relays 1' to 6' remain unoperated and the circuit to the start magnet 201 of the rotary contact group and the stop magnet 132 of the transmitter, is completed from ground at the tongue of relay 4' through the back contacts and tongues of relays 4', 3', 2' and 1' in series, and thence through the tongue and back contact of relay 129, conductor 199, magnet 201, and conductor 147, to the stop magnet 132. Upon each operation of magnet 201, the tape is stepped ahead, the brushes 127 and 128 meanwhile remaining at rest. This continues until all of the blank portion of the tape has been advanced through the tape transmitter and the first code combination brought into engagement with the transmitting pins of the tape transmitter.

It should be noted in connection with the rub-out and blank tape signals, that they are eliminated without transmitting any signals over the line and without a movement of the transmitter brushes so that they do not tend to throw the transmitter and printers out of phase. Consequently, no unison signals are required following either blank tape or rub-out signals.

The transmission is effected at a rapid rate, each new combination being set up in the tape transmitter during the transmission of press impulses so that there is no time lost and all the operations are accurately timed by means of the rotary switches, whereby the period of each operation may be reduced to the minimum required without allowing for the errors in timing occasioned by the usual timing relays heretofore employed.

While we have shown the slow operating switches 131 and 177 as dash-pot controlled, it is obvious that any type of slow operating switch may be employed, such as an escapement controlled time switch or clock mechanism, and many other changes and modifications may be made in the system without departing from the invention, and therefore we do not desire to be limited to the exact details shown and described except in accordance with the appended claims.

What we claim is:

1. A telegraph transmitting system comprising a transmitting apparatus arranged to transmit variable numbers of current alternations followed by sustained impulses and mechanically operated circuit controlled means for determining the period of said sustained impulses.

2. A telegraph transmitting system comprising a transmitting apparatus arranged to transmit variable numbers of current alternations followed by sustained impulses and a rotary contact mechanism operable upon completion of the transmission of the current alternations for initiating the sustained impulses and determining the period thereof.

3. An automatic telegraph system comprising a tape controlled transmitting apparatus arranged to transmit variable numbers of current alternations followed by sustained impulses and mechanically operated circuit controlled means for determining the period of said sustained impulses and for advancing the tape through the transmitter in timed relation to said sustained impulse.

4. An automatic telegraph system comprising a tape controlled transmitting apparatus arranged to transmit variable numbers of current alternations followed by a sustained impulse, the polarity of said sustained impulse being variable to effect a shift selection and mechanically operated circuit controlled means for determining the period of said sustained impulse, said last means also controlling the advancing of the tape through the transmitter to set up the succeeding signal and the preparing of means for the transmission of the correct polarity of the succeeding sustained impulse.

5. A telegraph transmitting system comprising an impulse generator, a transmitter having transmitting contacts adapted to be set up in accordance with the provisions of a permutation code and arranged to control the operation of the impulse generator and means responsive to a code combination composed entirely of marking signals, set-up in the transmitter, for holding said impulse generator inoperative and for setting up a new code combination in the transmitter.

6. A telegraph transmitting system comprising an impulse generator, a tape transmitter having transmitting contacts adapted to be set up in accordance with the provisions of a permutation code and arranged to control the operation of the impulse generator and means operative upon passage of a section of blank tape into the tape transmitter for holding said impulse generator inoperative and for advancing a new section of tape into the tape transmitter.

7. A telegraph transmitting system comprising an impulse generator, a transmitter having transmitting contacts adapted to be set up in accordance with the provisions of a permutation code and arranged to control the operation of the impulse generator and means responsive to a code combination composed entirely of marking or entirely of spacing signals, set up in the transmitter, for holding said impulse generator inoperative and for setting up a new code combination in the transmitter.

8. A telegraph transmitting system comprising an impulse generator, a transmitter having transmitting contacts adapted to be set up in accordance with the provisions of a permutation code and arranged to control the operation of the impulse generator and means responsive to a predetermined code combination, set-up in the transmitter, for holding the impulse generator inoperative and for setting up a new code combination in the transmitter.

9. In a telegraph transmitting system, an impulse generator, a transmitter having transmitting contacts adapted to be set-up in accordance with the provisions of a permutation code and arranged to control the operation of the impulse generator and rotary contact apparatus, operative in response to a predetermined signal combination set-up in the transmitter, for maintaining the impulse generator at rest and for setting up a new signal combination in the transmitter.

10. A telegraph transmitting system comprising an impulse generating apparatus arranged to transmit variable numbers of impulses followed by a sustained impulse, a selecting device for controlling said impulse generating apparatus and means responsive to a predetermined setting of said selective device for momentarily interrupting the sustained impulse, said means also controlling the impulse generating apparatus to transmit a predetermined number of impulses following the termination of the sustained impulse.

11. A telegraph transmitting apparatus comprising a pair of transmission lines, impulse generating apparatus arranged to transmit variable numbers of impulses followed by a sustained impulse over one line and to transmit a sustained impulse over the other line substantially concurrently with said first mentioned sustained impulse, a selecting device for controlling the operations of said apparatus and means responsive to a predetermined setting of said selecting device for momentarily interrupting the sustained impulse over one line while maintaining it continuously over the other line.

12. A telegraph transmitting system comprising a line, an impulse generating apparatus associated therewith, a tape transmitter having transmitting contacts adapted to be set up in accordance with a permutation code and arranged to control the operation of the impulse generating apparatus, means responsive to a predetermined permutation code combination set-up in said transmitter, to transmit corresponding step-by-step signal impulses over the line and means also responsive to said permutation code combination to control the impulse generating apparatus to transmit a predetermined number of additional step-by-step signal impulses over the line following the transmission of said first step-by-step signals.

13. A ticker transmitter comprising an impulse generator, means for setting up combinations of permutation code for controlling the operation of said impulse generator and a plurality of groups of mechanically operated contacts, each group controlling a definite sequence of operation of the transmitter, said contact groups being selectively operated by said setting-up means to control said sequence of operation.

14. A ticker transmitter comprising an impulse generator, means for controlling the number of impulses transmitted by the impulse generator comprising a selecting head having a plurality of segmented rings and brushes movable relative thereto, a plurality of contacts arranged to be set-up in accordance with a permutation code, circuit connections between said contacts and segments whereby selective circuits will be completed for each code combination in a definite position of said brushes, said circuits serving to stop the operation of the impulse generator, the number of rings of said selecting head being less than the number of units of the permutation code employed.

15. In a ticker transmitter, an impulse generator, means for controlling the number of impulses transmitted by said impulse generator comprising a selector head having a plurality of segmented rings and brushes movable relative thereto and means responsive to permutation code combinations for setting up baffle circuits through the segments and brushes of the selector head to arrest the brushes in any predetermined position, the number of rings of said selector head being less than the number of units of the permutation code employed.

16. In a telegraph transmitter, an impulse generator, a selecting head, a selecting device adapted to complete baffle circuits through said selecting head for controlling the operation of the impulse generator, said selecting device in one position thereof causing continued operation of the impulse generator and means independent of said selector head for arresting the operation of the impulse generator after a predetermined interval.

17. In a telegraph system, a printer having a type wheel, a line, means for controlling the transmission of limited groups of impulses over the line to step the type wheel into a printing position, separate means for controlling the sustained transmission of current alternations over the line and a slow acting switch adapted to interrupt said sustained transmission after a predetermined interval.

18. In a two wire telegraph transmitting system, means for transmitting impulses over one line followed by sustained impulses over each line, means controlled by permutation code combinations for determining the number of impulses transmitted and means for momentarily interrupting the sustained impulse over one line while maintaining it continuously over the other line.

19. In a ticker transmitter having an impulse generator for transmitting variable numbers of current alternations, means for transmitting impulses of different character, length and sequence following said current alternations, means for timing the transmission of said impulses comprising a plurality of rotary contacts, a driving means therefor, means normally retaining the contacts at rest and means acting upon the cessation of transmission of the current alternations for releasing said rotary contacts to control the transmission of said impulses.

20. In a ticker transmitter, an impulse generator changer, a selectively controlled rotary device adapted to control the operation of the impulse generator, to transmit variable numbers of current alternations, a group of contact drums adapted to time the transmission of sustained impulses following said current alternations, said drums normally being held at rest, a release means for the drums and means for operating said release means upon the cessation of transmission of said current alternations.

21. In a page printing telegraph receiver, a type wheel rotatable step-by-step by line impulses, mechanism for performing ancillary functions, also under the control of line impulses and means under the control of permutation code character combinations for transmitting said line impulse to position said type wheel and actuate said mechanism.

22. In a page printing telegraph system, a receiving printer having a rotatable type wheel, an escapement device having an actuating magnet energized by variable numbers of line impulses to cause the type wheel to rotate step-by-step in unison with the line impulses, carriage return mechanism operable by separate signals, transmission apparatus including means for generating said line impulses and carriage return signals and a permutation code type of transmitter co-acting with said means to control the number of line impulses and the carriage return signals transmitted to the printer.

In testimony whereof, we affix our signatures.

JAMES W. LONG.
ROBERT STEENECK.